United States Patent
Swope

(10) Patent No.: US 11,900,229 B1
(45) Date of Patent: Feb. 13, 2024

(54) APPARATUS AND METHOD FOR ITERATIVE MODIFICATION OF SELF-DESCRIBING DATA STRUCTURES

(71) Applicant: Dita Strategies, Inc., Portland, OR (US)

(72) Inventor: Amber Swope, Portland, OR (US)

(73) Assignee: Dita Strategies, Inc.

( * ) Notice: Subject to any disclaimer, the term of this patent is extended or adjusted under 35 U.S.C. 154(b) by 0 days.

(21) Appl. No.: 18/198,479

(22) Filed: May 17, 2023

(51) Int. Cl.
*G06N 20/00* (2019.01)
*G06F 16/21* (2019.01)

(52) U.S. Cl.
CPC ........... *G06N 20/00* (2019.01); *G06F 16/211* (2019.01)

(58) Field of Classification Search
CPC .............................. G06F 16/211; G06N 20/00
See application file for complete search history.

(56) References Cited

U.S. PATENT DOCUMENTS

| | | | |
|---|---|---|---|
| 8,992,228 B2 | 3/2015 | Kostoff | |
| 2007/0038930 A1* | 2/2007 | Derrick | G06F 40/221 715/236 |
| 2020/0133927 A1* | 4/2020 | Hsieh | G06F 16/2322 |
| 2020/0293616 A1* | 9/2020 | Nelson | G06F 16/345 |
| 2021/0200943 A1 | 7/2021 | Aviyam | |
| 2021/0312474 A1 | 10/2021 | Yu | |
| 2022/0253490 A1 | 8/2022 | Tai | |
| 2023/0153641 A1* | 5/2023 | Manda | G06F 40/205 707/603 |

OTHER PUBLICATIONS

Kinza Yasar, network packet, TechTarget.com, retrieved on Jul. 29, 2023, retrieved from the Internet <URL: https://www.techtarget.com/searchnetworking/definition/packet?Offer=abt_pubpro_AI-Insider> (Year: 2022).*

* cited by examiner

*Primary Examiner* — Tyler J Torgrimson
(74) *Attorney, Agent, or Firm* — Caldwell Intellectual Property Law

(57) ABSTRACT

An apparatus and method for iterative modification of self-describing data structures. The apparatus includes a memory with instructions configuring at least a processor to generate at least a self-describing data structure and acquire metadata. The memory containing instructions further configuring the at least a processor to modify the at least a self-describing data structure, including dividing the at least a self-describing data structure into a plurality of data structure modules and associating the metadata with a data structure module of the plurality of data structure modules. The memory containing instructions further configuring the at least a processor to configure a downstream device to generate graphical user interface elements as a function of the modified at least a data structure and the associated metadata.

16 Claims, 9 Drawing Sheets

United States Patent US 11,900,229 B1

APPARATUS AND METHOD FOR ITERATIVE MODIFICATION OF SELF-DESCRIBING DATA STRUCTURES

FIELD OF THE INVENTION

The present invention generally relates to the field of self-describing data structure management. In particular, the present invention is directed to an apparatus and method for iterative modification of self-describing data structures.

BACKGROUND

It is currently difficult to manage data and metadata in an efficient manner. Particularly, existing solutions for the modification and association of self-describing data structures and metadata are not sufficient.

SUMMARY OF THE DISCLOSURE

In an aspect, an apparatus for iterative modification of self-describing data structures is described. The apparatus includes at least a processor and a memory communicatively connected to the at least a processor, wherein the memory contains instructions configuring the at least a processor to generate at least a self-describing data structure and acquire metadata. The memory containing instructions further configuring the at least a processor to modify the at least a self-describing data structure, wherein modifying the at least a self-describing data structure includes dividing the at least a self-describing data structure into a plurality of data structure modules and associating the metadata with a data structure module of the plurality of data structure modules. The memory containing instructions further configuring the at least a processor to configure a downstream device to generate graphical user interface elements as a function of the modified at least a data structure and the associated metadata.

In another aspect, a method for iterative modification of self-describing data structure is described. The method includes generating, by at least a processor, at least a self-describing data structure. The method further includes acquiring, by the at least a processor, metadata. The method further includes modifying, by the at least a processor, the at least a self-describing data structure, wherein modifying the at least a self-describing data structure includes dividing the at least a self-describing data structure into a plurality of data structure modules and associating the metadata with a data structure module of the plurality of data structure modules. The method further includes configuring, by the at least processor, a downstream device to generate graphical user interface elements as a function of the modified at least a data structure and the associated metadata.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and method for iterative modification of self-describing data structures. This may allow make it easier to generate graphical user interface elements from the self-describing data structures later on.

Aspects of the present disclosure can be used to classify self-describing data structures and/or metadata to classification. Then, the self-describing data structures and/or metadata may be aggregated according to those classifications.

Aspects of the present disclosure allow for a processor to configure a downstream device to generate graphical user interface elements as a function of modified data structures and associated metadata. This may involve transmitting modified data structures and associated metadata to a downstream device. This may involve packet-based communication.

Figure 1:
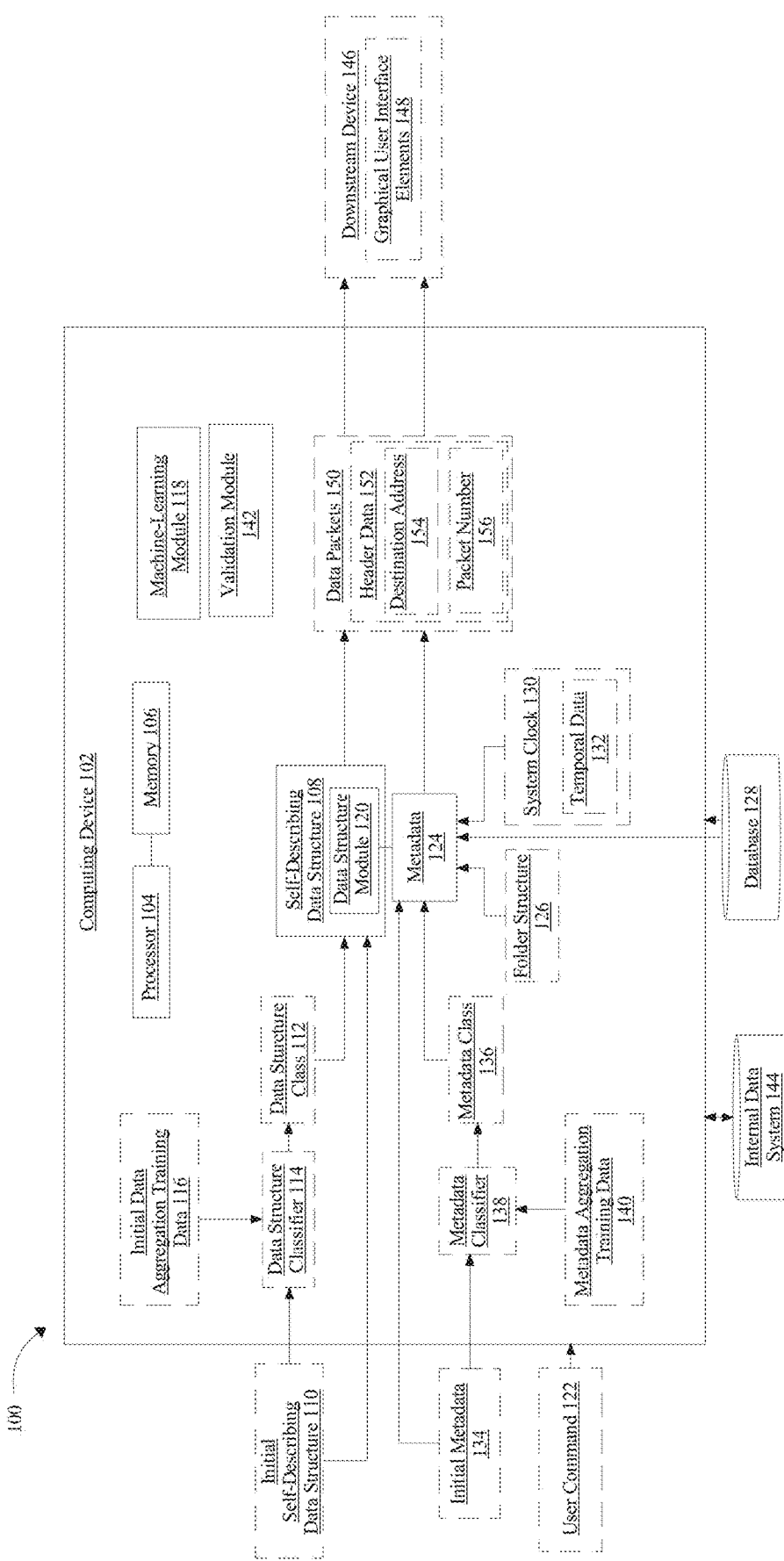
FIG. 1 is an exemplary embodiment of an apparatus for iterative modification of self-describing data structures.

Referring now to FIG. 1, an exemplary embodiment of an apparatus 100 for iterative modification of self-describing data structures is illustrated. Apparatus 100 includes a computing device 102. Apparatus 100 includes a processor 104. Processor 104 may include, without limitation, any processor described in this disclosure. Processor 104 may be included in a computing device. Computing device 102 may include any computing device as described in this disclosure, including without limitation a microcontroller, microprocessor, digital signal processor (DSP) and/or apparatus 100 on a chip (SoC) as described in this disclosure. Computing device 102 may include, be included in, and/or communicate with a mobile device such as a mobile telephone or smartphone. Computing device 102 may include a single computing device operating independently, or may include two or more computing device operating in concert, in parallel, sequentially or the like; two or more computing devices may be included together in a single computing device or in two or more computing devices. Computing device 102 may interface or communicate with one or more additional devices as described below in further detail via a network interface device. Network interface device may be utilized for connecting computing device 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 102 may include but is not limited to, for example, a computing device or cluster of computing devices in a first location and a second computing device or cluster of computing devices in a second location. Computing device 102 may include one or more computing devices dedicated to data storage, security, distribution of traffic for load balancing, and the like. Computing device 102 may distribute one or more computing tasks as described below across a plurality of computing devices of computing device, which may operate in parallel, in series, redundantly, or in any other manner used for distribution of tasks or memory between computing devices. Computing device 102 may be implemented, as a non-limiting example, using a "shared nothing" architecture.

With continued reference to FIG. 1, computing device 102 may be designed and/or configured to perform any method, method step, or sequence of method steps in any embodiment described in this disclosure, in any order and with any degree of repetition. For instance, computing device 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 102 may further include memory 106. Memory 106 may contain one or more instructions configuring processor 104 to perform actions as described throughout this disclosure. Memory 106 may be communicatively connected to processor 104. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 may be configured to generate at least a self-describing data structure 108. A "self-describing data structure," for the purposes of this disclosure, is a data structure that contains data as well as metadata that describes the format and/or meaning of the data. In some embodiments, self-describing data structure 108 may include data formats such as Extensible Markup Language (XML). As non-limiting examples, self-describing data structure 108 may include data formats such as XML, Yet Another Markup Language (YAML), JavaScript Object Notation (JSON), Protocol Buffers, AXON, and the like. Self-describing data structure 108 may include a pointer to another self-referential data structure. Self-describing data structure 108 may include dynamic data structures such as trees, linked lists, and the like. Self-describing data structure 108 may include codified identifiers, origins, destinations, and the like relating to data within self-describing data structure 108.

With continued reference to FIG. 1, generating self-describing data structure 108 may include receiving at least self-describing data structure 108. Receiving self-describing data structure 108 may include receiving self-describing data structure 108 from a database. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. In some embodiments, database may be located locally to computing device 102. In some embodiments, database may be located remotely to computing device 102.

With continued reference to FIG. 1, receiving self-describing data structure 108 may include receiving self-describing data structure 108 from a user input. For the purposes of this disclosure, "user input" is an input received from a user of apparatus 100. In some embodiments, user input may include at least a self-describing data structure 108. User input may be received using wired or wireless communication. Wired communication may include, as non-limiting examples, fiber optics, cable, ethernet, and the like. Wireless communication may include cellular data, 3G, 4G, 5G, LTE, satellite communication, radio, WiFi, LiFi, line-of-sight communication, and the like.

With continued reference to FIG. 1, generating at least self-describing data structure 108 may include instantiating at least self-describing data structure 108. "Instantiating," for the purposes of this disclosure, refers to the act of generating a data structure from a template or blueprint.

With continued reference to FIG. 1, generating at least self-describing data structure 108 may include receiving at least an initial self-describing data structure 110. Initial self-describing data structure 110 may be consistent with self-describing data structure 108. For the purposes of this disclosure, an "initial self-describing data structure" is a self-describing data structure that is altered, combined, or otherwise changed to become self-describing data structure 108. Receiving initial self-describing data structure 110 may include receiving initial self-describing data structure 110 from a database. Receiving initial self-describing data structure 110 may include receiving self-describing data structure 108 from a user input. In some embodiments, user input may include at least initial self-describing data structure 110.

With continued reference to FIG. 1, generating at least self-describing data structure 108 may include aggregating the at least an initial self-describing data structure 110 into a data structure class 112. For the purposes of this disclosure, a "data structure class" is a classification of a data structure based on the contents or properties of that data structure. As non-limiting examples, data structure class 112 may include classes pertaining to the type of a data structure, such as linked list, tree, and the like. As non-limiting examples, data structure class 112 may include classes pertaining to the contents of a data structure, such as Boolean values, integers, dates, text, and the like.

With continued reference to FIG. 1, in some embodiments, aggregating the at least an initial self-describing data structure 110 into a data structure class 112 may include determining data structure class 112. In some embodiments, processor 104 may determine data structure class 112 by parsing initial self-describing data structure 110. In some embodiments, processor 104 may parse initial self-referencing data structure for tags, and then determine data structure class 112 as a function of the tags. For the purposes of this disclosure, "tags" are indicators in computer code that define the type of content within the tags. For example, initial self-describing data structure 110 may include "<date>" and "</date>," wherein the date tags indicate that the content between the tags is a date. As a non-limiting example, if initial self-describing data structure 110 includes "date" tags, it may be assigned a data structure class 112 of "date."

With continued reference to FIG. 1, in some embodiments, data structure class 112 may be determined using a data structure classifier 114. In some embodiments, aggregating the at least initial self-describing data structure 110 into data structure class may include receiving initial data aggregation training data 116. Initial data aggregation training data 116 may include initial self-referencing data structures correlated to one or more data structure classes. Processor 104 may receive initial data aggregation training data 116 from a database as described in this disclosure. Processor 104 may receive initial data aggregation training data 116 from a user input. In some embodiments, initial data aggregation training data 116 may be collected from previous initial self-describing data structure 110 and data structure class 112. In some embodiments, these previous interactions may be stored in a database and then retrieved by processor 104 at a later time. In some embodiments, initial self-describing data structure 110 and/or data structure class 112 from previous interactions may be selectively used as part of initial data aggregation training data 116 as a function of data aggregation feedback. For the purposes of this disclosure, "data aggregation feedback" may be data pertaining to the quality and/or accuracy of data structure class 112 as it pertains to initial self-describing data structure 110. In some embodiments, data aggregation feedback may be received from a user of apparatus 100. Data aggregation feedback may include, as non-limiting examples, a rating out of 10, a rating out of 5, a "thumbs up" rating, a "thumbs down" rating, data indicating that data structure class 112 had to be adjusted later on, and the like. In some embodiments, data aggregation feedback may be received from a downstream device. Downstream device is described later in this disclosure.

Still referring to FIG. 1, aggregating the at least initial self-describing data structure 110 into data structure class may include training, using a machine-learning module 118, data structure classifier 114 using initial data aggregation training data 116. Machine-learning module may be consistent with machine-learning module 300 described with reference to FIG. 3. In some embodiments, aggregating the at least initial self-describing data structure 110 into data structure class may include generating data structure class 112 for the initial self-describing data structure 110 using data structure classifier 114. Data structure classifier 114 may be configured to receive initial self-describing data structure 110 as input and be configured to output an associated data structure class 112. In some embodiments, data structure classifier may use a fuzzy-set comparison as described with reference to FIG. 6.

With continued reference to FIG. 1, generating at least self-describing data structure 108 may include collecting data using a data scraper. In some embodiments, data may be derived from a web crawler. A "web crawler," as used herein, is a program that systematically browses the internet for the purpose of web indexing. The web crawler may be seeded with platform URLs, wherein the crawler may then visit the next related URL, retrieve the content, index the content, and/or measures the relevance of the content to the topic of interest. In some embodiments, computing device 102 may generate a web crawler to scrape data from a plurality of NFT, crypto, investing, and social media sites, blogs, or forums. The web crawler may be seeded and/or trained with a reputable website, such as robinhood.com, to begin the search. A web crawler may be generated by processor 104. In some embodiments, the web crawler may be trained with information received from an external user through a user interface. In some embodiments, the web crawler may be configured to generate a web query. A web query may include search criteria received from a user. For example, a user may submit a plurality of websites for the web crawler to search for financial data, educational data, statistical data, and the like. Additionally, the web crawler function may be configured to search for and/or detect one or more data patterns. A "data pattern" as used in this disclosure is a repeating form of information. A data pattern may include repeating pecuniary strategies, educational strategies, and the like. In some embodiments, the web crawler may be configured to determine the relevancy of a data pattern. Relevancy may be determined by a relevancy score. A relevancy score may be automatically generated by processor 104, received from a machine learning model, and/or received from the user. In some embodiments, a relevancy score may include a range of numerical values that may correspond to a relevancy strength of data received from a web crawler function. As a non-limiting example, a web crawler function may search the Internet for data related to an external user. The web crawler may return data, such as, as non-limiting examples, financial data, educational data, statistical data, and the like.

With continued reference to FIG. 1, generating at least a self-describing data structure 108 may include receiving data from an external system. In some embodiments, external system may include or be communicatively connected to a database, such as, for example, database 128. External system may include a content management system. A "content management system," for the purposes of this disclosure, is a system configured to allow the creation and modification of digital content. In some embodiments, content management system may include a component content management system. In some embodiments, external system may include a team management system. In some embodiments, external system may include a terminology management system. In some embodiments, external system may include a taxonomy management system. In some embodiments, external system may include a table management system. In some embodiments, external system may include a tag management system. In some embodiments, receiving data from the external system may include querying an application programming interface (API). An "application programming interface," for the purposes of this disclosure, is a software interface that allows two or more computer programs to communicate with each other.

With continued reference to FIG. 1, generating at least a self-describing data structure 108 may include generating at least a self-describing data structure 108 using a template. For the purposes of this disclosure, a "template" is a preset format for a file. Templates may include, as non-limiting examples, headers, footers, a body, elements, attributes, text, and the like. An "element" in a self-describing data structure, for the purposes of this disclosure, is everything from a start tag to a corresponding end tag, including the start and end tags. Elements may include textual information, such as the price of a book, the number of employees in a unit, the price of a part, and the like. In some embodiments, elements may include attributes. An "attribute" in a self-describing data structure, for the purposes of this disclosure, is an element of markup language that adjusts the behavior or display of an element. As a non-limiting example, a corporate template may be used for information regarding a corporation—for example, this may include information such as year of founding, recent profits, principal place of business, employee headcount, and the like. As a non-limiting example, template may include a personal data template which may include a name, image, place of work, work history, contact information, and the like.

With continued reference to FIG. 1, in some embodiments, generating at least a self-describing data structure 108 may include categorizing data into one or more data categories. For the purposes of this disclosure, a "data category," is an associative group of data. Data categories may include, as non-limiting examples, names, dates, addresses, telephone numbers, email addresses, work titles, accomplishments, and the like. In some embodiments, categorizing data into one or more data categories may include categorizing data into one or more data categories using a data parser. A "data parser," for the purposes of this disclosure, is software that is configured to convert data from one format to another. In some embodiments, data parser may be configured to identify dates. As a non-limiting example, data parser may identify dates as textual information having a format of MM/DD/YYYY, DD/MM/YYYY, YYYY/MM/DD, MONTH DAY YEAR, DAY MONTH YEAR, and the like. In some embodiments, data parser may identify contact information. As a non-limiting example, data parser may identify contact information including a phone number as textual information having a format of (###) ###-####, or an equivalent phone number format. As a non-limiting example, data parser may identify contact information including an email address as textual information having a format of [username]@[url], or an email address format.

With continued reference to FIG. 1, in some embodiments, categorizing data into one or more data categories may include categorizing data into one or more data categories using a data classifier. Data classifier may be consistent with any classifier machine-learning model disclosed in this disclosure. Data classifier may be configured to receive data as input and output data categories. Data classifier may be trained on data classifier training data. Data classifier training data may include a plurality of data sets correlated to data categories. As a non-limiting example, data classifier may receive as input data containing an "email," and may output a data category of "email," or "contact information." As a non-limiting example, data classifier may receive as input data containing an employee headcount, and may output a data category of, as non-limiting examples, "employee count," "employee information," "corporate information," and the like.

With continued reference to FIG. 1, computing device 102 may be configured to insert data into a data template as part of generating self-describing data structure. In some embodiments, inserting data into a data template may be a function of data category. As a non-limiting example, data having a data category of "contact information" may be inserted into a corresponding portion of a template (such as between email tags). As a non-limiting example, data having a data category of "corporate" may be inserted into a corresponding portion of a template containing corporate information. In some embodiments, this may involve the use of a data parser, which is described further above.

With continued reference to FIG. 1, in some embodiments, generating self-describing data structure may include identifying missing data, wherein the missing data is data that is not present in template. In some embodiments, computing device 102 may be configured to identify missing data and then use a web crawler, discussed further above, to locate missing data. As a non-limiting example, if contact information for a CEO of a corporation is identified as missing data the web crawler may be seeded with platform URLs corresponding to social media sites and corporate information websites. For example, this may include social media sites on which the CEO may have an account. In some embodiments, computing device 102 may be configured to prompt a user for user input corresponding to the missing data. The user input may then be added to the template to eliminate the missing data. In some embodiments, missing data may be generated using a large language model as described further below. The ability of processor to identify and locate missing data may reduce the need for human intervention, allowing apparatus 100 to operate more efficiently and autonomously.

With continued reference to FIG. 1, processor 104 is configured to modify the at least a self-describing data structure 108. Modifying the at least a self-describing data structure 108 may include dividing at least self-describing data structure into a plurality of data structure modules 120. Processor 104 may be configured to divide either self-describing data structure 108 and/or initial self-describing data structure 110 into a plurality of data structure modules 120. For the purposes of this disclosure, a "data structure module" is a portion or subsection of a self-describing data structure. In some embodiments, processor 104 may be configured to divide self-describing data structure 108 and/or initial self-describing data structure 110 as a function of a user command 122. For the purposes of this disclosure, a "user command" is an instruction or plurality of instructions received from a user for a processor to execute. As a non-limiting example, user command 122 may include one or more rules dictating how processor 104 is to divide self-describing data structure 108 and/or initial self-describing data structure 110.

With continued reference to FIG. 1, in some embodiments, data structure classifier 114 may be configured to receive one or more data structure modules 120 of initial self-describing data structure 110 and output a data structure class 112 for each of the one or more data structure modules 120. Initial data aggregation training data 116 may include a plurality of data structure modules of initial self-describing data structures correlated to data structure classes.

With continued reference to FIG. 1, in some embodiments, dividing self-describing data structure 108 and/or initial self-describing data structure 110 into a plurality of data structure modules 120 may include dividing self-describing data structure 108 and/or initial self-describing data structure 110 as a function of data structure class 112. In some embodiments, data structure class 112 may be determined by data structure classifier 114, as described above. As a non-limiting example, processor 104 may be configured to determine one or more data structure classes 112 for portions of self-describing data structure 108 and/or initial self-describing data structure 110. Processor 104 may then be configured to divide self-describing data structure 108 and/or initial self-describing data structure 110 in accordance with the portions of the self-describing data structure 108 and/or initial self-describing data structure 110 with different data structure classes 112.

Still referring to FIG. 1, in some embodiments, processor 104 may aggregate one or more initial self-describing data structures 110 as a function of data structure class 112. As a non-limiting example, initial self-describing data structures 110 with the same or similar data structure class 112 may be aggregated together, such as by creating self-describing data structure 108, wherein self-describing data structure contains references to the aggregated initial self-describing data structures 110. In some embodiments, processor 104 may aggregate one or more initial self-describing data structures 110 as a function of a user command 122.

Still referring to FIG. 1, in some embodiments, processor 104 may concatenate one or more initial self-describing data structures 110 as a function of data structure class 112. As a non-limiting example, initial self-describing data structures 110 with the same or similar data structure class 112 may be concatenated. For example, concatenating one or more initial self-describing data structures 110 may include combining the content of the one or more initial self-describing data structures 110 within self-describing data structure 108. In some embodiments, processor 104 may concatenate one or more initial self-describing data structures 110 as a function of a user command 122.

With continued reference to FIG. 1, in some embodiments, self-describing data structure 108, initial self-describing data structure 110, and/or modules thereof may include one or more tree data structures. For the purposes of this disclosure, a "tree data structure" is a hierarchical data structure including a plurality of connected nodes. Tree data structure may include one or more parent nodes. A "parent node," for the purposes of this disclosure, is a node that is connected to one or more succeeding nodes. Tree data structure may include one or more child nodes. A "child node," for the purposes of this disclosure, is a node that is connected to one or more proceeding nodes. Tree data structure may include one or more leaf nodes. A "leaf node," for the purposes of this disclosure is a type of child node that is not connected to any succeeding nodes. Tree data structure may include a root node. A "root node," for the purposes of this disclosure, is a type of parent node that is not connected to any proceeding nodes.

With continued reference to FIG. 1, in some embodiments, processor 104 constructs a tree data structure from self-describing data structure 108 and/or initial self-describing data structure 110. As a non-limiting example, processor 104 may be configured to parse self-describing data structure 108, initial self-describing data structure 110, and or any modules thereof to determine any data structures referenced therein. As a non-limiting example, a first module of self-describing data structure 108 may reference a second module of self-describing data structure 108 and a third module of self-describing data structure 108. Accordingly, based on these references, processor 104 may construct a tree data structure from these modules, wherein first module is a parent node, and second and third modules are child nodes of that parent node. Processor 104 may continue to parse self-describing data structure 108 to map out any references between modules or to any other data structures and construct a tree data structure from these references.

With continued reference to FIG. 1, processor 104 is configured to acquire metadata 124. "Metadata," for the purposes of this disclosure, is data that describes other data. In some embodiments, acquiring metadata 124 may include parsing at least a folder structure 126 of at least a self-describing data structure 108 for metadata 124. In some embodiments, processor 104 may use a parsing module to parse the at least a folder structure 126. For the purposes of this disclosure, a "folder structure" is a hierarchical representation of folders. In some embodiments, folder structure 126 may be a list of the folders in which self-describing data structure 108 and/or initial self-describing data structure 110 resides. For example, folder structure 126 may include "documents>projects>project A>April 2020," wherein the folder names are arranged so that they proceed from parent folder to child folder. As a non-limiting example, folder structure 126 may include the location of self-describing data structure 108 on a relational database. As a non-limiting example, continuing with this example, self-describing data structure 108 and/or initial self-describing data structure may reside in a folder named "April 2020." In some embodiments, parsing at least a folder structure 126 of at least a self-describing data structure 108 for metadata 124 may include parsing folder structure 126 for each data structure references within self-describing data structure. Also, while acquiring metadata 124 by parsing at least folder structure 126 is described primarily with respect to self-describing data structure 108, a person of ordinary skill in the art, after having reviewed the entirety of this disclosure, would appreciate that acquiring metadata 124 by parsing folder structure 126 may conducted similarly with initial self-describing data structure 110.

With continued reference to FIG. 1, metadata 124 may include codified identifiers, origins, destinations, and the like. In some embodiments, metadata 124 and/or self-describing data structure 108 may be retrieved from database 128. In some embodiments, folder structure 126 may include the location of self-describing data structure 108 on database 128. Database 128 may be implemented, without limitation, as a relational database, a key-value retrieval database such as a NOSQL database, or any other format or structure for use as a database that a person skilled in the art would recognize as suitable upon review of the entirety of this disclosure. Database 128 may alternatively or additionally be implemented using a distributed data storage protocol and/or data structure, such as a distributed hash table or the like. Database 128 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. Database 128 is further disclosed with reference to FIG. 2.

With continued reference to FIG. 1, in some embodiments, acquiring metadata 124 may include interrogating a system clock 130 for temporal data 132. For the purposes of this disclosure, a "system clock" is a clock of a computing device that tracks time. In some embodiments, system clock 130 may output temporal data 132. In some embodiments, system clock 130 may include a quartz crystal for time-keeping purposes. System clock 130 may send a signal containing temporal data 132 to components of computing device 102. In some embodiments, system clock 130 may be consistent with a "CPU clock." In some embodiments, processor may interrogate system clock 130 for temporal data 132 to determine metadata 124 for when self-describing data structure 108 and/or initial self-describing data structure was created, altered, modified, combined, moved, and the like. This may include, for example, interrogating system clock 130 when self-describing data structure 108 and/or initial self-describing data structure is altered, modified, combined, moved, and the like. Temporal data 132 may be in a variety of formats, including, but not limited to a count of ticks since a starting date, Unix time, year/month/day/hour/minute/second/milliseconds, a count of the number of 100-nanosecond ticks since Jan. 1, 1601, 00:00:00 UT as reckoned in the proleptic Gregorian calendar, calendar time, and the like. In some embodiments, processor 104 may be configured to convert temporal data 132 into an easier to read format before it is included in metadata 124. As a non-limiting example, processor 104 may convert temporal data 132 from Unix time to calendar time.

With continued reference to FIG. 1, acquiring metadata 124 may include receiving initial metadata 134. In some embodiments, initial metadata 134 and/or initial self-describing data structure 110 may be retrieved from database 128. Initial metadata 134 may be consistent with metadata 124. For the purposes of this disclosure, "initial metadata" is metadata that is altered, combined, or otherwise changed to become metadata 124. Receiving initial metadata 134 may include receiving initial metadata 134 from a database. In some embodiments, receiving initial metadata 134 may include receiving initial metadata 134 from a graph database. A "graph database," for the purposes of this disclosure, is a database that is configured to store nodes and relationships. As a non-limiting example, initial metadata 134 may include relationships between nodes or the position of nodes in graph database. Receiving initial metadata 134 may include receiving metadata 124 from a user input. In some embodiments, user input may include at least initial metadata 134. The ability of computing device 102 to acquire metadata without human intervention allows any missing metadata to be filed in automatically. This leads to more complete and robust self-describing data structures 108.

With continued reference to FIG. 1, generating at least metadata 124 may include aggregating the at least an initial metadata 134 into a metadata class 136. For the purposes of this disclosure, a "metadata class" is a classification of a data structure based on the contents or properties of that metadata or the data to which it refers. As non-limiting examples, metadata class 136 may include classes pertaining to the type of metadata, such as temporal, location, ownership, creator, and the like. In some embodiments, metadata class 136 may be determined according to data structure class 112 of the data to which initial metadata pertains. For example, metadata class 136 may be determined by inputting the data to which initial metadata 134 pertains into data structure classifier 114 and assigning the output data structure class 112 to metadata class 136.

With continued reference to FIG. 1, in some embodiments, aggregating the at least an initial metadata 134 into a metadata class 136 may include determining metadata class 136. In some embodiments, processor 104 may determine metadata class 136 by parsing initial metadata 134. In some embodiments, processor 104 may parse initial metadata 134 for tags, and then determine metadata class 136 as a function of the tags. For the purposes of this disclosure, "tags" are indicators in computer code that define the type of content within the tags. For example, initial metadata 134 may include "<date>" and "</date>," wherein the date tags indicate that the content between the tags is a date. As a non-limiting example, if initial metadata 134 includes "date" tags, it may be assigned a metadata class 136 of "date."

With continued reference to FIG. 1, in some embodiments, metadata class 136 may be determined using a metadata classifier 138. In some embodiments, aggregating the at least initial metadata 134 into data structure class may include receiving metadata aggregation training data 140. Metadata aggregation training data 140 may include initial metadata 134 correlated to one or more metadata classes. Processor 104 may receive metadata aggregation training data 140 from a database as described in this disclosure. Processor 104 may receive metadata aggregation training data 140 from a user input. In some embodiments, metadata aggregation training data 140 may be collected from previous initial metadata 134 and metadata class 136. In some embodiments, these previous interactions may be stored in a database and then retrieved by processor 104 at a later time. In some embodiments, initial metadata 134 and/or data structure class 112 from previous interactions may be selectively used as part of metadata aggregation training data 140 as a function of data aggregation feedback. For the purposes of this disclosure, "data aggregation feedback" may be data pertaining to the quality and/or accuracy of data structure class 112 as it pertains to initial metadata 134. In some embodiments, data aggregation feedback may be received from a user of apparatus 100. Data aggregation feedback may include, as non-limiting examples, a rating out of 10, a rating out of 5, a "thumbs up" rating, a "thumbs down" rating, data indicating that metadata class had to be adjusted later on, and the like. In some embodiments, data aggregation feedback may be received from a downstream device. Downstream device is described later in this disclosure.

Still referring to FIG. 1, aggregating the at least initial metadata 134 into data structure class may include training, using a machine-learning module 118, metadata classifier 138 using metadata aggregation training data 140. In some embodiments, aggregating the at least initial metadata 134 into data structure class may include generating metadata class 136 for the initial metadata 134 using metadata classifier 138. Metadata classifier 138 may be configured to receive initial metadata 134 as input and be configured to output an associated metadata class 136. In some embodiments metadata classifier 138 may use a fuzzy-set comparison as described with reference to FIG. 6.

With continued reference to FIG. 1, in some embodiments, processor 104 may be configured to divide either metadata 124 and/or initial metadata 134 into a plurality of metadata modules. For the purposes of this disclosure, a "metadata module" is a portion or subsection of a self-describing data structure. In some embodiments, processor 104 may be configured to divide metadata 124 and/or initial metadata 134 as a function of a user command 122. For the purposes of this disclosure, a "user command" is an instruction or plurality of instructions received from a user for a processor to execute. As a non-limiting example, user command 122 may include one or more rules dictating how processor 104 is to divide metadata 124 and/or initial metadata 134.

With continued reference to FIG. 1, in some embodiments, metadata classifier 138 may be configured to receive one or more metadata modules of initial metadata 134 and output a metadata class 136 for each of the one or more metadata modules. Metadata aggregation training data 140 may include a plurality of metadata modules of initial metadata correlated to metadata classes.

Still referring to FIG. 1, in some embodiments, processor 104 may aggregate one or more initial metadata 134 as a function of metadata class 136. As a non-limiting example, initial metadata 134 with the same or similar metadata class 136 may be aggregated together, such as by creating metadata 124, wherein metadata 124 contains references to the aggregated initial metadata 134. In some embodiments, processor 104 may aggregate one or more initial metadata 134 as a function of a user command 122.

Still referring to FIG. 1, in some embodiments, processor 104 may concatenate one or more initial metadata 134 as a function of metadata class 136. As a non-limiting example, initial metadata 134 with the same or similar metadata class 136 may be concatenated. For example, concatenating one or more initial metadata 134 may include combining the content of the one or more initial metadata 134 within metadata 124. In some embodiments, processor 104 may concatenate one or more initial metadata 134 as a function of a user command 122.

With continued reference to FIG. 1, modifying at least self-describing data structure includes associating metadata 124 with a data structure module 120 of the plurality of data structure modules 120. In some embodiments, associating metadata 124 with a data structure module 120 of the plurality of data structure modules 120 may be a function of user command 122. As a non-limiting example, user command 122 may specify which metadata 124 to associate with which data structure module 120. As a non-limiting example, user command 122 may specify one or more rules for processor 104 to apply to associate metadata with data structure module 120. In some embodiments, associating metadata 124 with data structure module 120 of the plurality of data structure modules 120 may include comparing data structure class 112 to metadata class 136. As a non-limiting example, wherein data structure class 112 of data structure module 120 is similar or the same as a metadata class 136 of metadata 124, then metadata 124 and data structure module 120 may be associated by processor 104. In some embodiments, processor 104 may associate a metadata module to a data structure module 120 as a function of comparing a metadata class 136 of metadata module to a data structure class 112 of a data structure module 120. As a non-limiting example, wherein data structure class 112 of data structure module 120 is similar or the same as a metadata class 136 of metadata module, then metadata module and data structure module 120 may be associated by processor 104. In some embodiments, processor 104 may associate metadata 124 and self-describing data structure 108 by inserting metadata 124 into self-describing data structure 108 and/or by associating self-describing data structure 108 with metadata in a larger and/or linking data structure, which may, e.g., include both metadata 124 and self-describing data structure 108 as elements and/or may include pointers, labels, or other identifiers of metadata 124, self-describing data structure 108, and/or elements thereof as elements of the larger and/or linking data structure. In some embodiments, processor 104 may associate metadata 124 and self-describing data structure 108 by inserting a reference to metadata 124 into self-describing data structure 108.

With continued reference to FIG. 1, in some embodiments, computing device 102 may include a validation module 142. A "validation module," for the purposes of this disclosure is a software module configured to check the consistency and integrity of data. In some embodiments, computing device 102 may be configured to validate self-describing data structure 108 using validation module 142. In some embodiments, validating self-describing data structure 108 may include applying data consistency rules. For the purposes of this disclosure, "data consistency rules" are rules that check for consistency among different pieces of data in a data structure. As a non-limiting example, applying data consistency rules may include comparing different portions of self-describing data structure 108. As a non-limiting example, applying data consistency rules may include comparing a first portion of self-describing data structure 108 against a second portion of self-describing data structure 108. As a non-limiting example, applying data consistency rule may include comparing data in self-describing data structure 108 representing the employee counts for departments within a corporation to data in self-describing data structure 108 representing the total employee count for the corporation. In some embodiments, validating self-describing data structure 108 may include applying a pathlength rule to self-describing data structure 108. A "pathlength," for the purposes of this disclosure is the distance between two nodes within a data structure. A "pathlength rule," for the purposes of this disclosure, is a rule regarding the pathlength between elements of a self-describing data structure. As a non-limiting example, pathlength rule may include a maximum pathlength. In some embodiments, applying pathlength rule may include calculating a pathlength between elements of self-describing data structure 108 and comparing the pathlength to a maximum pathlength. In some embodiments, if maximum pathlength is exceeded, computing device may be configured to convert a data structure. As a non-limiting example, this may include converting a tree data structure to a higher order tree data structure. As a non-limiting example, this may include converting a binary tree data structure to a trinary tree data structure.

With continued reference to FIG. 1, in some embodiments, validation self-describing data structure 108 may include checking self-describing data structure for content completeness. Checking self-describing data structure 108 for content completeness may include checking self-describing data structure 108 against a content requirement. For the purposes of this disclosure, a "content requirement" is one or more types of content that must be present in a self-describing data structure 108 in order for it to be validated. In some embodiments, content requirement may be a function of data structure class 112. As a non-limiting example, different data structure class 112 may have different content requirements. As a non-limiting example, if data structure class 112 is "policy," content requirements may include a section identification, paragraph identification, and third-party requirement. As a non-limiting example, if data structure class 112 is "contact," content requirements may include a name, an email, a job title, and the like. In some embodiments, if self-describing data structure 108 does not satisfy content requirement, self-describing data structure 108 may be rejected. In some embodiments, if self-describing data structure 108 does not satisfy content requirement, computing device 102 may be configured to user a data crawler, as described above, to locate the data required by content requirement.

With continued reference to FIG. 1, in some embodiments, computing device 102 may be configured to copy content linked within self-describing data structure 108. In some embodiments, computing device 102 may retrieve content linked within self-describing data structure 108 and store it on an internal data system 144. Internal data system 144 may be consistent with any database as disclosed in this disclosure. For the purposes of this disclosure, "internal data system," is a data system that is under the control of the same entity as apparatus 100. As a non-limiting example, computing device 102 may retrieve an image linked within self-describing data structure 108 and store it in internal data system 144. As a non-limiting example, computing device 102 may retrieve a style sheet (such as a CSS file) linked within self-describing data structure 108 and store it in internal data system 144. In some embodiments, computing device 102 may be configured to generate an internal association corresponding to the location of the content on the internal data system 144. Computing device 102 may be configured to update self-describing data structure 108 to include the internal association. This may improve the reliability of self-describing data structures 108 as it ensures that the content within self-describing data structure can be retrieved by a downstream device. This may also allow users more control over content within self-describing data structure 108. For example, if content linked within self-describing data structure is stored on a server of a third party, that content may be updated, tampered with, or otherwise changed without notice. Thus, storing content on an internal data system 144 and updating self-describing data structure 108 to include an internal association allows a user to fully control the content. In some embodiments, computing device 102 may be configured to scan the content for malware, adware, viruses, and the like before storing the content on internal data system 144. This may further enhance the safety and stability of self-describing data structure 108.

With continued reference to FIG. 1, processor 104 may configure a downstream device 146 to generate graphical user interface elements 148 as a function of modified at least a self-describing data structure 108 and associated metadata 124. "Downstream device," for the purposes of this disclosure, is a computing device that is configured to receive data from computing device 102. In some embodiments, downstream device 146 may include a server. In some embodiments, downstream device 146 may include, as non-limiting examples, a desktop computer, a laptop computer, a tablet computer, a smartphone, and the like. "Configuring downstream device 146 to generate graphical user interface elements 148" may include sending data and/or one or more instructions to downstream device 146 which causes downstream device 146 to generate graphical user interface elements 148.

With continued reference to FIG. 1, a "graphical user interface," for the purposes of this disclosure, is a type of user interface which allows users to interact with a computing device using one or more graphical icons. A "graphical user interface element," for the purposes of this disclosure, is an element of a graphical user interface. Graphical user interface elements may include, as non-limiting examples, menus, pages, windows, buttons, images, modules, and the like.

With continued reference to FIG. 1, in some embodiments, processor 104 may be configured to transmit self-describing data structure 108 and associated metadata 124 to downstream device 146. In some embodiments, transmission may include wireless communication Wireless communication may include cellular data, 3G, 4G, 5G, LTE, satellite communication, radio, WiFi, LiFi, line-of-sight communication, and the like. In some embodiments, transmission may include wired communication. Wired communication may include, as non-limiting examples, fiber optics, cable, ethernet, and the like.

With continued reference to FIG. 1, transmitting self-describing data structure 108 and associated metadata 124 to downstream device 146 may include transmitting self-describing data structure 108 and associated metadata 124 to downstream device 146 using packet-based communication. For the purposes of this disclosure, "packet-based communication" is a method of data transmission, wherein data is grouped into packets and transmitted over a digital network. Transmitting self-describing data structure 108 and associated metadata 124 to downstream device 146 using packet-based communication may include dividing self-describing data structure 108 and associated metadata 124 into a plurality of data packets 150. A "data packet," for the purposes of this disclosure, is a unit of data configured to be carried over a packet-switched network. A data packet 150 may include a maximum packet size. Maximum packet size may be determined by computing device 102, downstream device 146, a server or other intermediary computing device 102, or by a communication protocol. Processor 104 may divide self-describing data structure 108 and associated metadata 124 into data packets 150 such that each data packet 150 is below maximum packet size.

With continued reference to FIG. 1, in some embodiments, data packets 150 may each include header data 152. "Header data," for the purposes of this disclosure, is data in a data packet that provides information about a data packet's origin, destination, or contents. In some embodiments, processor 104 may be configured to assign header data 152 to each of the plurality of data packets 150. In some embodiments, header data 152 may include a destination address 154 of downstream device 146. A "destination address," for the purposes of this disclosure, is an internet protocol (IP) address of a computing device that is the destination for a data packet. Destination address may include the IP address of downstream device 146. IP address may include a global IP address. IP address may include a local IP address. In some embodiments, header data 152 may include a packet number 156. A "packet number," for the purposes of this disclosure, is one or more numbers that uniquely identify a data packet's place within a plurality of data packets. A packet number 156 may include a number indicating the place of data packet 150 within the complete information representing self-describing data structure 108 and associated metadata 124. Packet number 156 may include a number indicating the number of data packets 150 that the complete information of self-describing data structure 108 and associated metadata 124. Packet number 156 may allow downstream device 146 to assemble data packets 150 in order to reconstruct self-describing data structure 108 and associated metadata 124. Header data 152 may also include, as non-limiting examples, an IP version, a header length, type of service, size of datagram, flags, identification, a fragmentation offset, a time to live, a protocol, a header checksum, a source address, options, and the like. Data packet 150 may also include a payload. For the purposes of this disclosure, a "payload" of a data packet, is the actual data being sent. In some embodiments, payload of data packets 150 may include the data pertaining to self-describing data structure 108 and associated metadata 124.

With continued reference to FIG. 1, computing device 102 may be configured to generate test files. For the purposes of this disclosure, "test files" are files that are created to test computer system or functionality. Test files may be self-describing data structures. Test files may be generated using templates as disclosed above. In some embodiments, computing device 102 may use a web crawler as disclosed above to acquire data for test file. In some embodiments, computing device may use a large language model (LLM) to generate components of test file. "Large language model," as used herein, is a deep learning algorithm that can recognize, summarize, translate, predict and/or generate text and other content based on knowledge gained from massive datasets. Large language model may be trained on large sets of data; for example, training sets may include greater than 1 million words. Training sets may be drawn from diverse sets of data such as, as non-limiting examples, novels, blog posts, articles, emails, and the like. In some embodiments, training sets may include a variety of subject matters, such as, as nonlimiting examples, medical tests, romantic ballads, beat poetry, emails, advertising documents, newspaper articles, and the like. LLM, in some embodiments, may include Generative Pretrained Transformer (GPT), GPT-2, GPT-3, GPT-4, and the like. GPT, GPT-2, GPT-3, and GPT-4 are products of Open AI Inc., of San Francisco, CA. In some embodiments, LLM may receive a prompt or text string as input and generate text as output. As a non-limiting example, to generate an email for test file, LLM may receive an input of "generate an email" and may output an email, such as jdoe@gmail.com. In some embodiments, computing device 102 may perform validation as described above on test file. In some embodiments, test file may be used as initial self-describing data structure 110 and/or initial metadata 134. In some embodiments, test file may be used as self-describing data structure 108 and/or metadata 124. In some embodiments, test file may be split into data packets 150 as described above. In some embodiments, test file may be sent to downstream device 146 as described above. In some embodiments, computing device 102 may be configured to receive test feedback from downstream device 146, wherein test feedback is feedback regarding the suitability of test file.

With continued reference to FIG. 1, the input or output of any step described above may be presented to a user for approval. In some embodiments, this data may be presented to user using a graphical user interface. In some embodiments, this data may be presented to user using a display. Display may include an OLED display, LED display, LCD display, CRT display, plasma display, and the like. As a non-limiting example, initial self-describing data structure 110 may be presented to user for approval. As a non-limiting example, initial metadata 134 may be presented to user for approval. As a non-limiting example, metadata class 136 may be presented to user for approval. As a non-limiting example, data structure class 112 may be presented to user for approval. As a non-limiting example, self-describing data structure 108 may be presented to user for approval. As a non-limiting example, data structure module 120 may be presented to user for approval. As a non-limiting example, metadata 124 may be presented to user for approval. In some embodiments, user may respond to the presentation of data for approval using a user command 122 as disclosed above. User command may include a positive response, such as "yes," "y," "good," or the like, indicating approval. User command may include a positive response, such as "no," "n," "bad," or the like, indicating disapproval. If computing device 102 receives user command 122 indicating approval, computing device 102 may proceed with the process described above. If computing device 102 receives user command 122 indicating disapproval, computing device 102 may abort the process or may rerun the process that resulted in disapproval. In some embodiments, data that received disapproval may be excluded from training sets, wherein data that receives approval may be added to training sets in order to improve the machine-learning models discussed in this disclosure.

Figure 2:
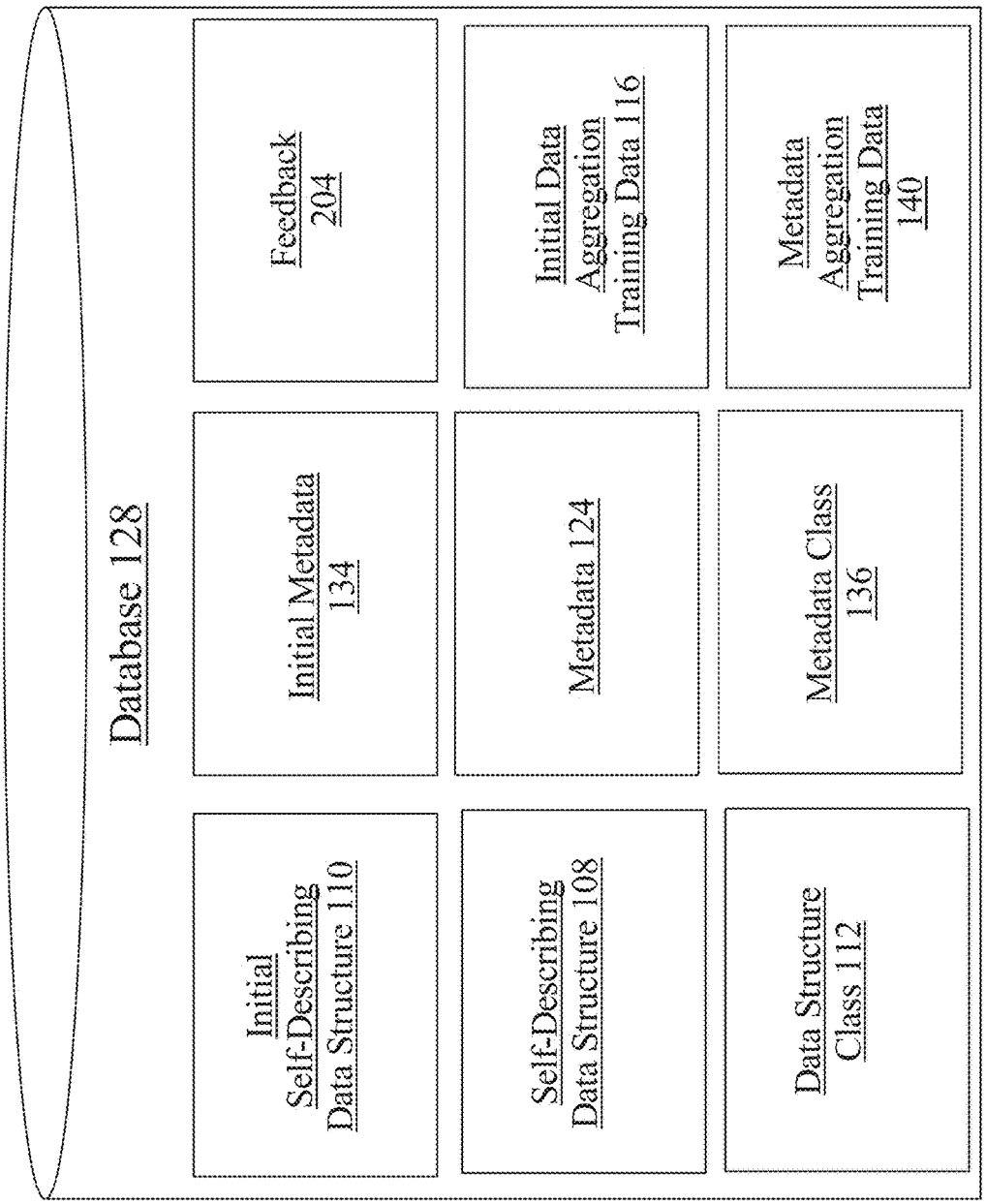
FIG. 2 is an illustration of an exemplary embodiment of a database.

Referring now to FIG. 2, an exemplary database 128 is illustrated. Database 128 may include initial self-describing data structure 110, self-describing data structure 108, and data structure class 112. In some embodiments, processor 104 may retrieve initial self-describing data structure 110, self-describing data structure 108, and/or data structure class 112. In some embodiments, processor 104 may store data structure class 112 in database 128 once it is determined. In some embodiments, processor 104 may store self-describing data structure 108 in database 128 once it has been determined. In some embodiments, database 128 may include initial metadata 134, metadata 124, and metadata class 136. In some embodiments, processor 104 may retrieve initial metadata 134, metadata 124, and/or metadata class 136. In some embodiments, processor 104 may store metadata class 136 in database 128 once it is determined. In some embodiments, processor 104 may store metadata 124 in database 128 once it has been determined.

With continued reference to FIG. 2, database 128 may include feedback 204. Feedback 204 may be consistent with any other feedback discussed in this disclosure. Feedback 204 may be received from downstream device 146 and stored by processor 104 in database 128. Database 128 may include initial data aggregation training data 116 and/or metadata aggregation training data 140. In some embodiments, processor 104 may take inputs and outputs of one of the classifiers described above and store those inputs and outputs as training data in database 128. In some embodiments, inputs and outputs may be selected or removed from training data as a function of feedback 204.

Figure 3:
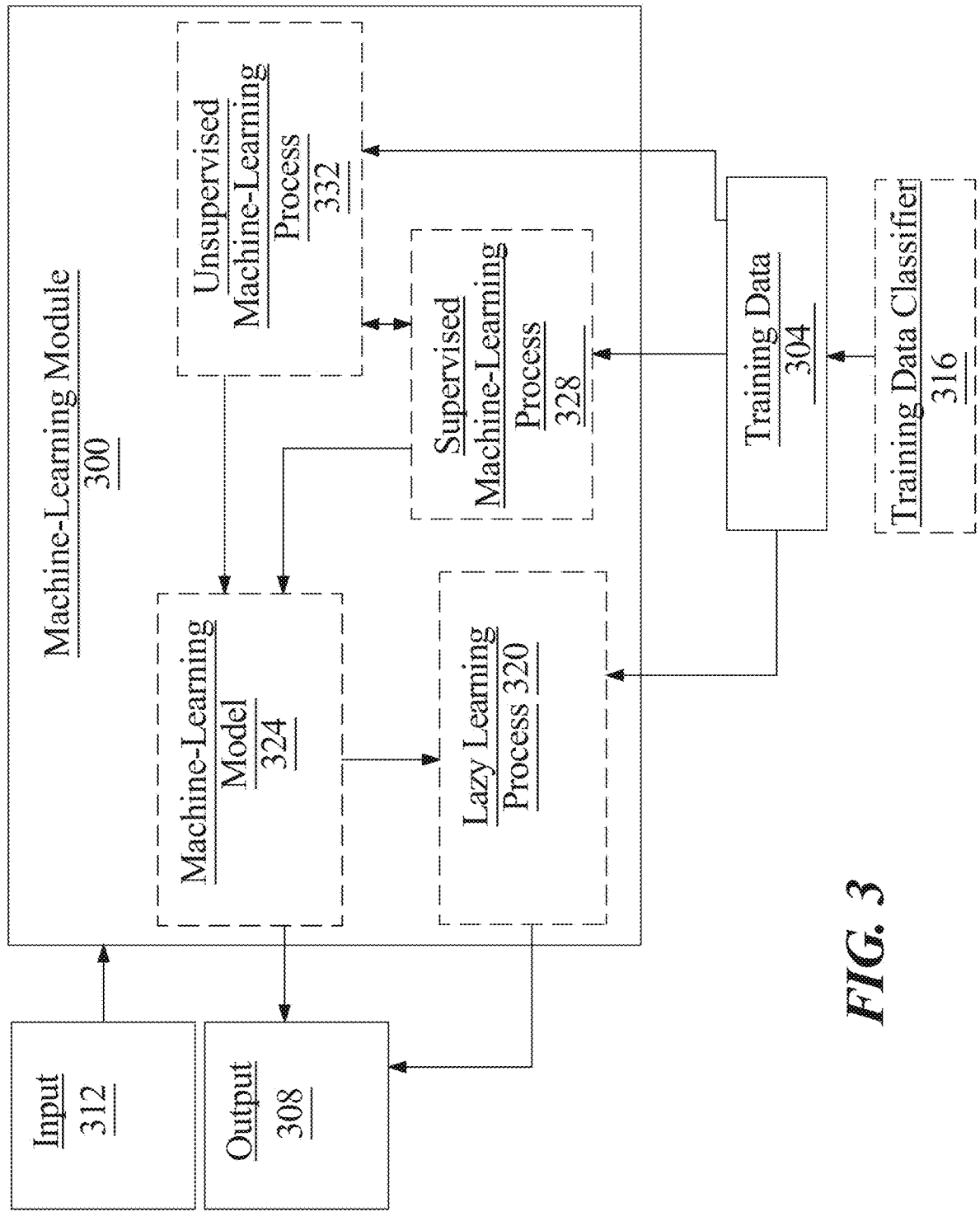
FIG. 3 is a diagram of an exemplary embodiment of a machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example initial self-describing data structure, self-describing data structure, and/or data class. As a non-limiting illustrative example initial metadata, metadata, and/or metadata class.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to type of metadata, content categories, and the like.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include self-referencing data structures as described above as inputs, data classes as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 4:
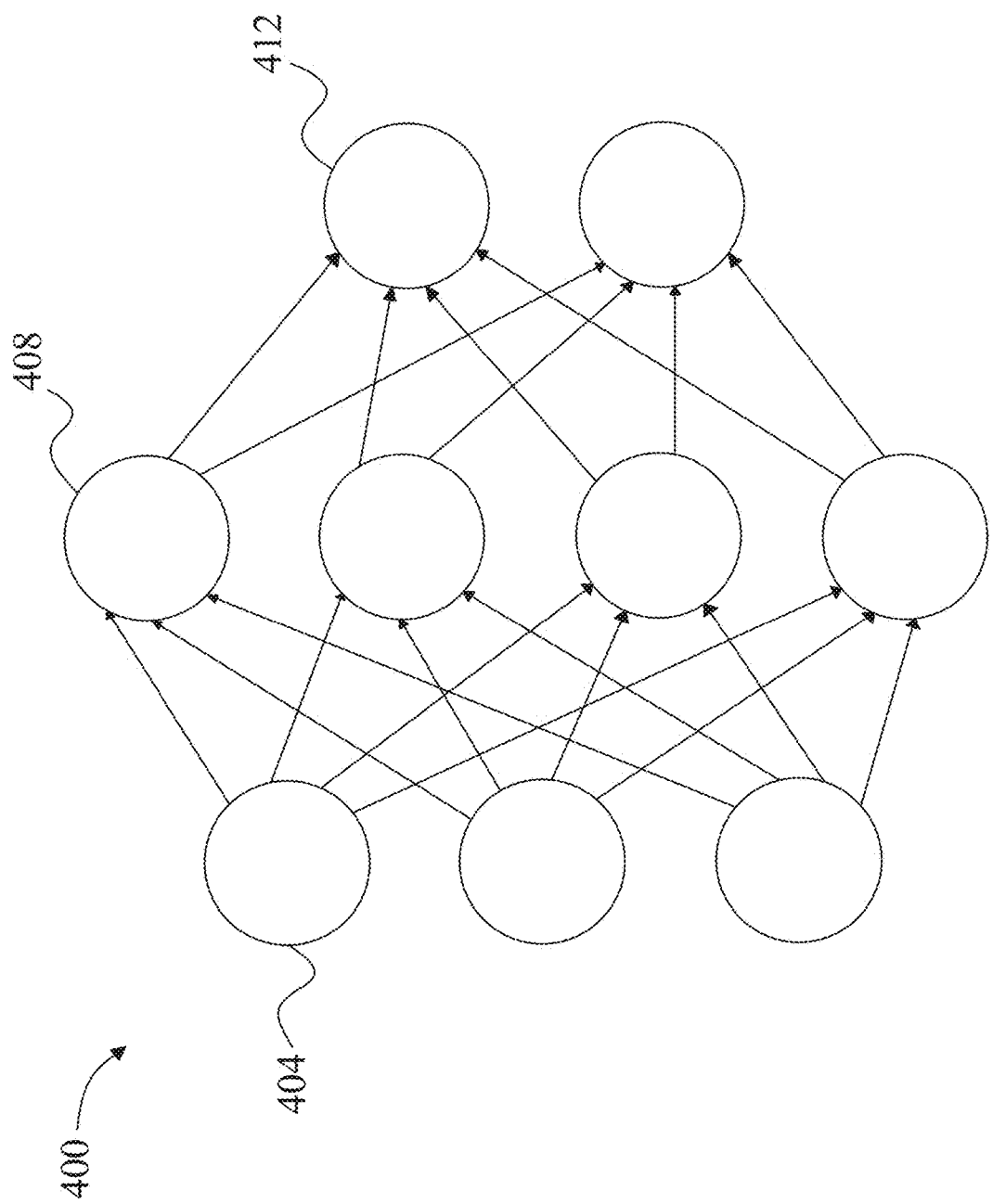
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
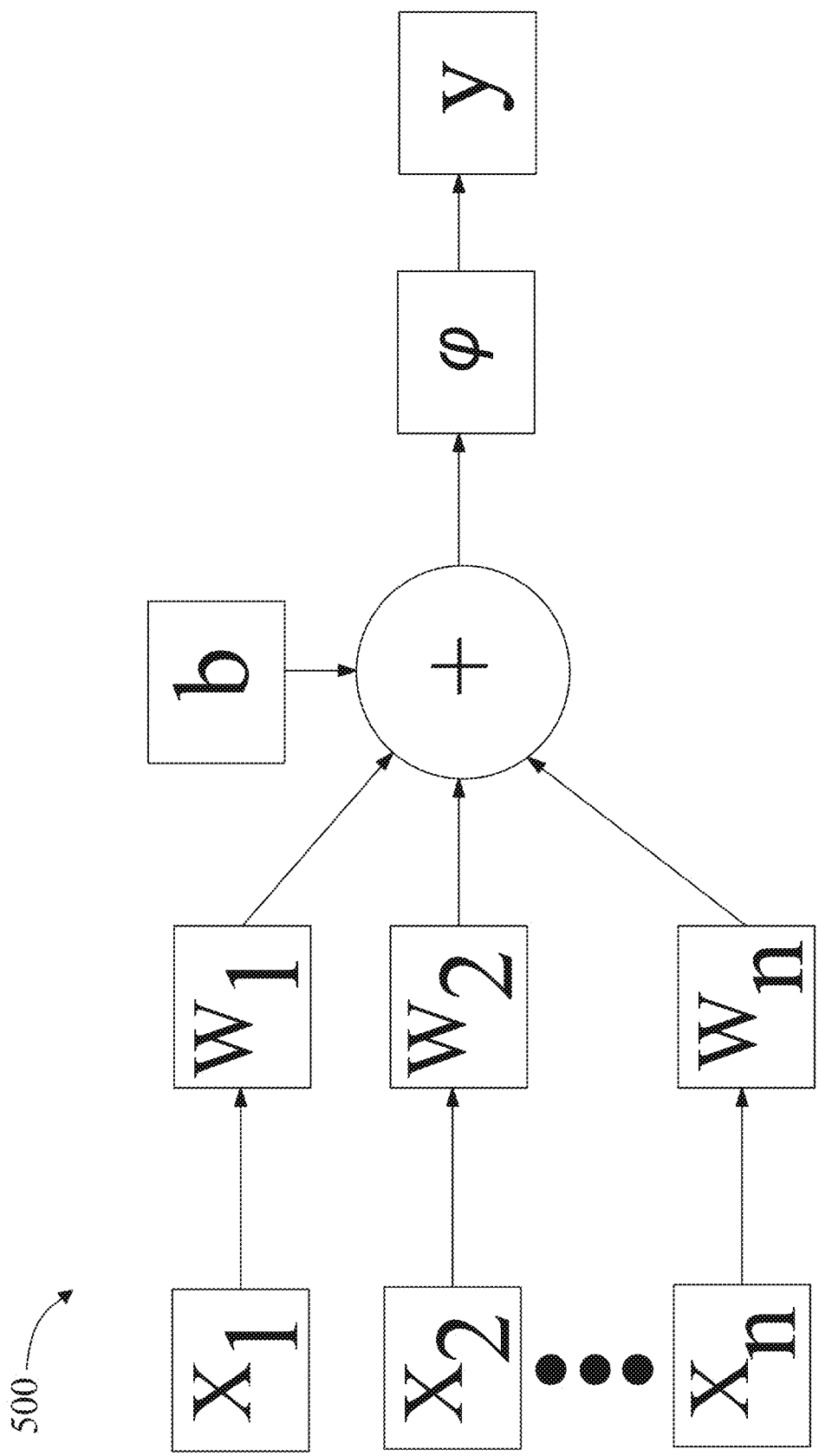
FIG. 5 is a diagram of an exemplary embodiment of a node of a neural network.

Referring now to FIG. 5, an exemplary embodiment 500 of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
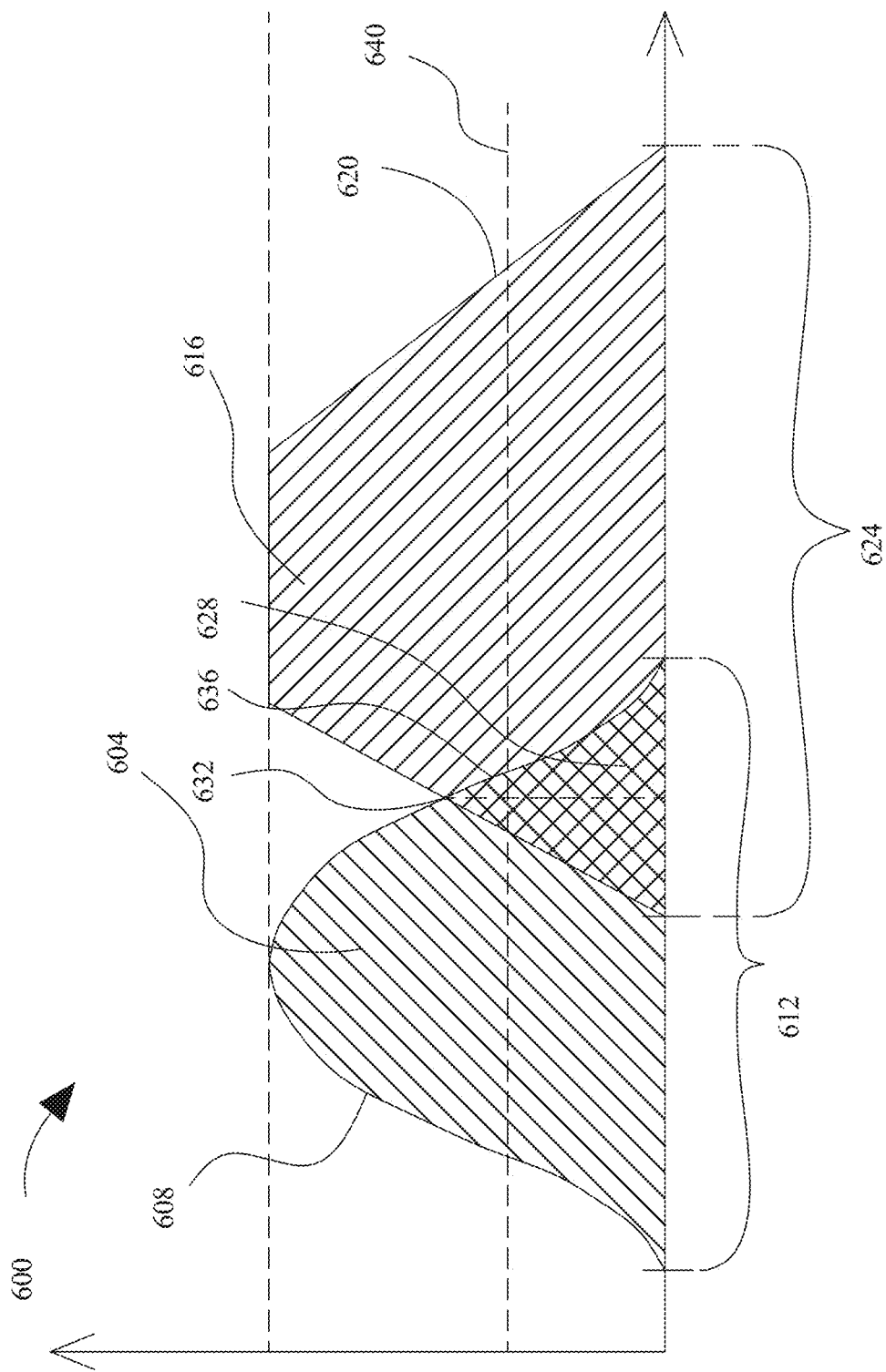
FIG. 6 is a diagram of an exemplary embodiment of a fuzzy set comparison.

Referring to FIG. 6, an exemplary embodiment of fuzzy set comparison 600 is illustrated. This apparatus may be implemented by inputting multiple potentially subjective determinations related to constraints which are represented as fuzzy sets and output a probability distribution indicating likelihood that the compliance will be at the target threshold. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 804. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 6, first fuzzy set 604 may represent any value or combination of values as described above, including output from one or more machine-learning models. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, threshold may indicate a sufficient degree of overlap between an output from one or more machine-learning models and a predetermined class, for combination to occur as described above. Alternatively or additionally, each threshold may be tuned by a machine-learning and/or statistical process, for instance and without limitation as described in further detail below.

Further referring to FIG. 6, in an embodiment, a degree of match between fuzzy sets may be used to determine target threshold compliance based on input data such as the website data. Where multiple fuzzy matches are performed, degrees of match for each respective fuzzy set may be computed and aggregated through, for instance, addition, averaging, or the like, to determine an overall degree of match.

Still referring to FIG. 6, a computing device may use a logic comparison program, such as, but not limited to, a fuzzy logic model to determine a score. A score may include, but is not limited to, amateur, average, knowledgeable, superior, and the like; each such score may be represented as a value for a linguistic variable representing score, or in other words a fuzzy set as described above that corresponds to a degree of similarity as calculated using any statistical, machine-learning, or other method that may occur to a person skilled in the art upon reviewing the entirety of this disclosure. In other words, a given element of target threshold compliance may have a first non-zero value for membership in a first linguistic variable value and a second non-zero value for membership in a second linguistic variable value. In some embodiments, determining a score may include using a linear regression model. A linear regression model may include a machine learning model. A score classification model may be configured to input collected data and cluster data to a centroid based on, but not limited to, frequency of appearance, and the like. In some embodiments, and score classification model may include a K-means clustering model. In some embodiments, and score classification model may include a particle swarm optimization model. In some embodiments, determining a score of target threshold compliance may include using a fuzzy inference engine. A fuzzy inference engine may be configured to map one or more elements using fuzzy logic. In some embodiments, a plurality of entity assessment devices may be arranged by a logic comparison program into score arrangements. An "score arrangement" as used in this disclosure is any grouping of objects and/or data based on skill level and/or output score. This step may be implemented as described above in FIGS. 1-7. Membership function coefficients and/or constants as described above may be tuned according to classification and/or clustering algorithms. For instance, and without limitation, a clustering algorithm may determine a Gaussian or other distribution of questions about a centroid corresponding to a given score level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 6, an inference engine may be implemented according to input and/or output membership functions and/or linguistic variables. For instance, a first linguistic variable may represent a first measurable value pertaining to a degree of similarity, while a second membership function may indicate a degree of similarity of a subject thereof, or another measurable value. Continuing the example, an output linguistic variable may represent, without limitation, a score value. An inference engine may combine rules, such as: "if the difficulty level is 'hard' and the popularity level is 'high', the question score is 'high'"— the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Figure 7:
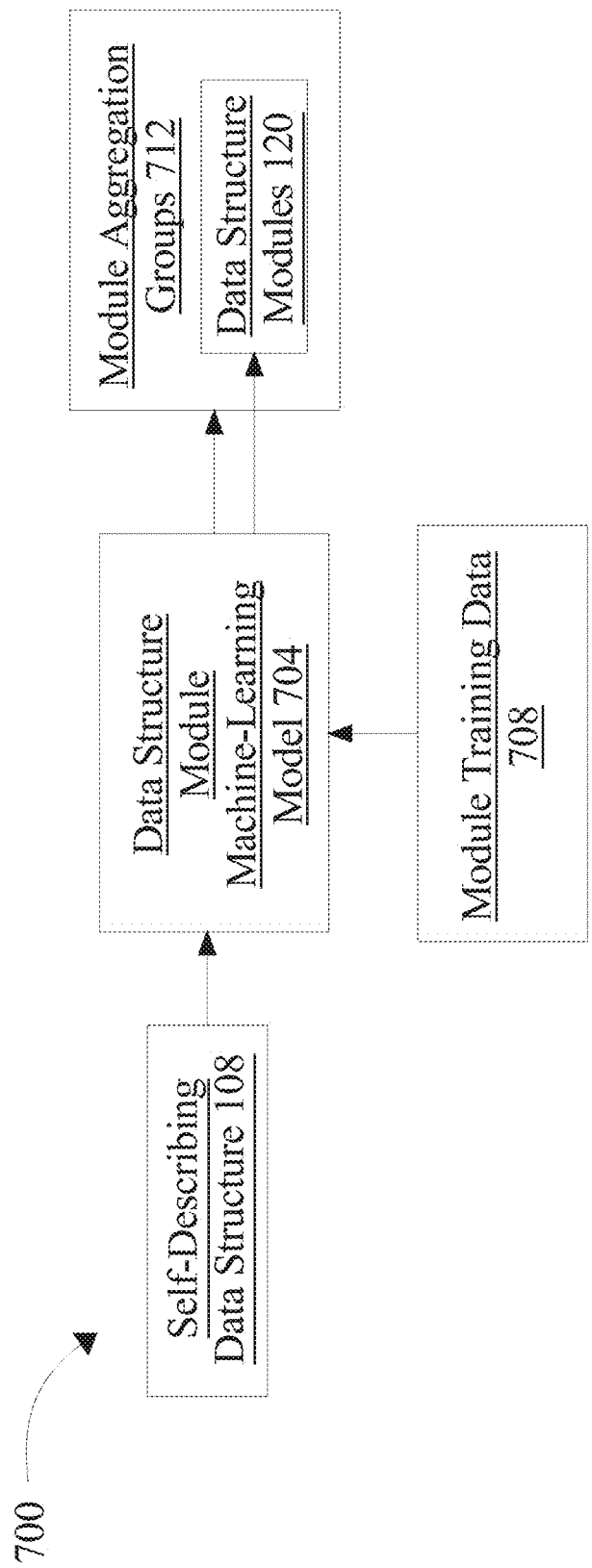
FIG. 7 is a diagram of an exemplary embodiment of a system for aggregation and division of data structure modules.

Referring now to FIG. 7, a system 700 for aggregation and division of data structure modules is illustrated. System 700 includes a data structure machine-learning model 704. Data structure machine-learning model 704 may be trained using a machine-learning module as described with reference to FIG. 3. Data structure machine-learning model 704 may be consistent with a machine-learning model described with reference to FIG. 3.

With continued reference to FIG. 7, data structure machine-learning model 704 may receive self-describing data structure 108 as input. In some embodiments, data structure machine-learning model 704 may be configured to output one or more data structure modules 120 of self-describing data structure 108. In some embodiments, as a non-limiting example, data structure machine-learning model 704 may be used by processor 104 to divide the at least a self-describing data structure 108 into a plurality of data structure modules 120 as described further with reference to FIG. 1. Data structure machine-learning model 704 may be trained using module training data 708. Module training data may include a plurality of self-describing data structures correlated to a plurality of data structure modules of those self-describing data structures. In some embodiments, in module training data 708, each of the plurality of self-describing data structures may be correlated to multiple data structure modules. In some embodiments, the data structure modules 120 may be presented to a user, such as by using a display, as a proposed division of self-describing data structure 108 into data structure modules 120.

With continued reference to FIG. 7, in some embodiments, data structure machine-learning model 704 may receive self-describing data structure 108 as input and may be configured to output one or more module aggregation groups 712. For the purposes of this disclosure, a "module aggregation group" is a categorization of data structure modules. In some embodiments, module training data 708 may include a plurality of self-describing data structures correlated to data structure modules of those self-describing data structures, wherein the data structure modules are assigned to one or more module aggregation groups. Thus, data structure machine-learning model 704 may be configured to output data structure modules 120 with associated module aggregation groups 712. Module aggregation groups 712 may allow a computing device, such as processor 104 of FIG. 1, to aggregate data structure modules 120. As a non-limiting example, data structure modules 120 with the same or related module aggregation groups 712 may be aggregated together. In some embodiments, a computing device, such as processor 104 of FIG. 1, may propose an aggregation of data structure module 120 with the same or related module aggregation groups 712. In some embodiments, this proposition may be presented to a user, such as by using a display.

With continued reference to FIG. 7, in some embodiments, data structure module machine-learning model 704 may include a plurality of machine-learning modules as described with reference to FIG. 3. In some embodiments, data structure module machine-learning model 704 may include a classifier; for example, a classifier may be used to generate module aggregation groups 712. Classifiers are further discussed with reference to FIG. 3.

Figure 8:
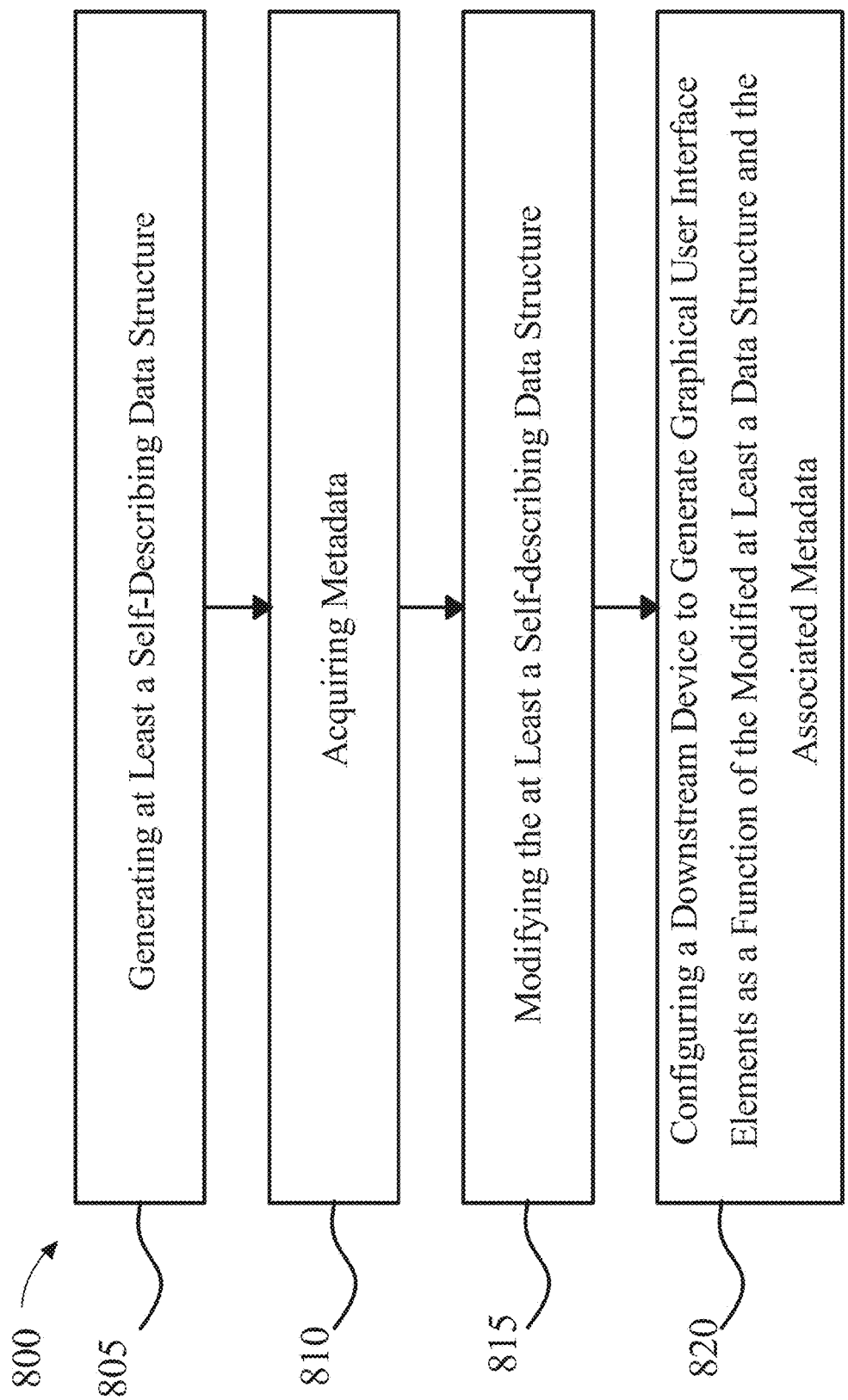
FIG. 8 is a flowchart of a method for iterative modification of self-describing data structures.

Referring now to FIG. 8, a method 800 for iterative modification of self-describing data structure is illustrated. Method 800 includes a step 805 of generating, by at least a processor, at least a self-describing data structure. In some embodiments, generating at least a self-describing data structure includes receiving at least a self-describing data structure. In some embodiments, generating at least a self-describing data structure includes instantiating a self-describing data structure. In some embodiments, at least a data structure module of the plurality of data structure modules may include a tree data structure. This may be implemented as described with reference to FIGS. 1-7.

Still referring to FIG. 8, method 800 includes a step 810 of acquiring, by the at least a processor, metadata. In some embodiments, step 810 may include parsing at least a folder structure of the at least a self-describing data structure for the metadata. In some embodiments, step 810 may include interrogating a system clock for temporal data. This may further include generating the metadata as a function of the temporal data. In some embodiments, step 810 may include receiving initial metadata. In some embodiments, step 810 may include aggregating the initial metadata into a metadata class. In some embodiments, aggregating the initial metadata into a metadata class may include receiving metadata aggregation training data, wherein the metadata aggregation training data includes examples of metadata correlated to one or more metadata classes. In some embodiments, aggregating the initial metadata into a metadata class may include training, using a machine-learning module, a metadata classifier using the metadata aggregation training data. In some embodiments, aggregating the initial metadata into a metadata class may include generating the metadata class for the metadata using the metadata classifier. This may be implemented as described with reference to FIGS. 1-7.

Still referring to FIG. 8, method 800 includes a step 815 of modifying, by the at least a processor, the at least a self-describing data structure. Step 815 includes dividing the at least a self-describing data structure into a plurality of data structure modules and associating the metadata with a data structure module of the plurality of data structure modules. In some embodiments, step 815 may include receiving at least an initial self-referencing data structure. In some embodiments, step 815 may include aggregating at least an initial self-referencing data structure into a data structure class. In some embodiments, aggregating the at least an initial self-referencing data structure may include receiving initial data aggregation training data, wherein the initial data aggregation training data includes initial self-referencing data structures correlated to one or more data structure classes. In some embodiments, aggregating at least an initial self-referencing data structure may include training, using a machine-learning module, a data structure classifier using the initial data aggregation training data. In some embodiments, aggregating the at least an initial self-referencing data structure may include generating the data structure class for the at least an initial self-referencing data structure using the data structure classifier. This may be implemented as described with reference to FIGS. 1-7.

Still referring to FIG. 8, method 800 includes a step 820 of configuring, by the at least processor, a downstream device to generate graphical user interface elements as a function of the modified at least a data structure and the associated metadata. This may be implemented as described with reference to FIGS. 1-7.

Still referring to FIG. 8, in some embodiments, method 800 may include a further step of transmitting, by the at least a processor, the at least a self-describing data structure and the associated metadata to the downstream device. In some embodiments, transmitting the at least a self-describing data structure and the associated metadata to the downstream device may include dividing the modified at least a self-describing data structure and the associated metadata into a plurality of data packets. In some embodiments, transmitting the at least a self-describing data structure and the associated metadata to the downstream device may include assigning header data to each of the plurality of data packets, wherein the header data includes at least a destination address of the downstream device and a packet number. In some embodiments, transmitting the at least a self-describing data structure and the associated metadata to the downstream device may include transmitting the plurality of data packets to the downstream device using packet-based communication. This may be implemented as described with reference to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
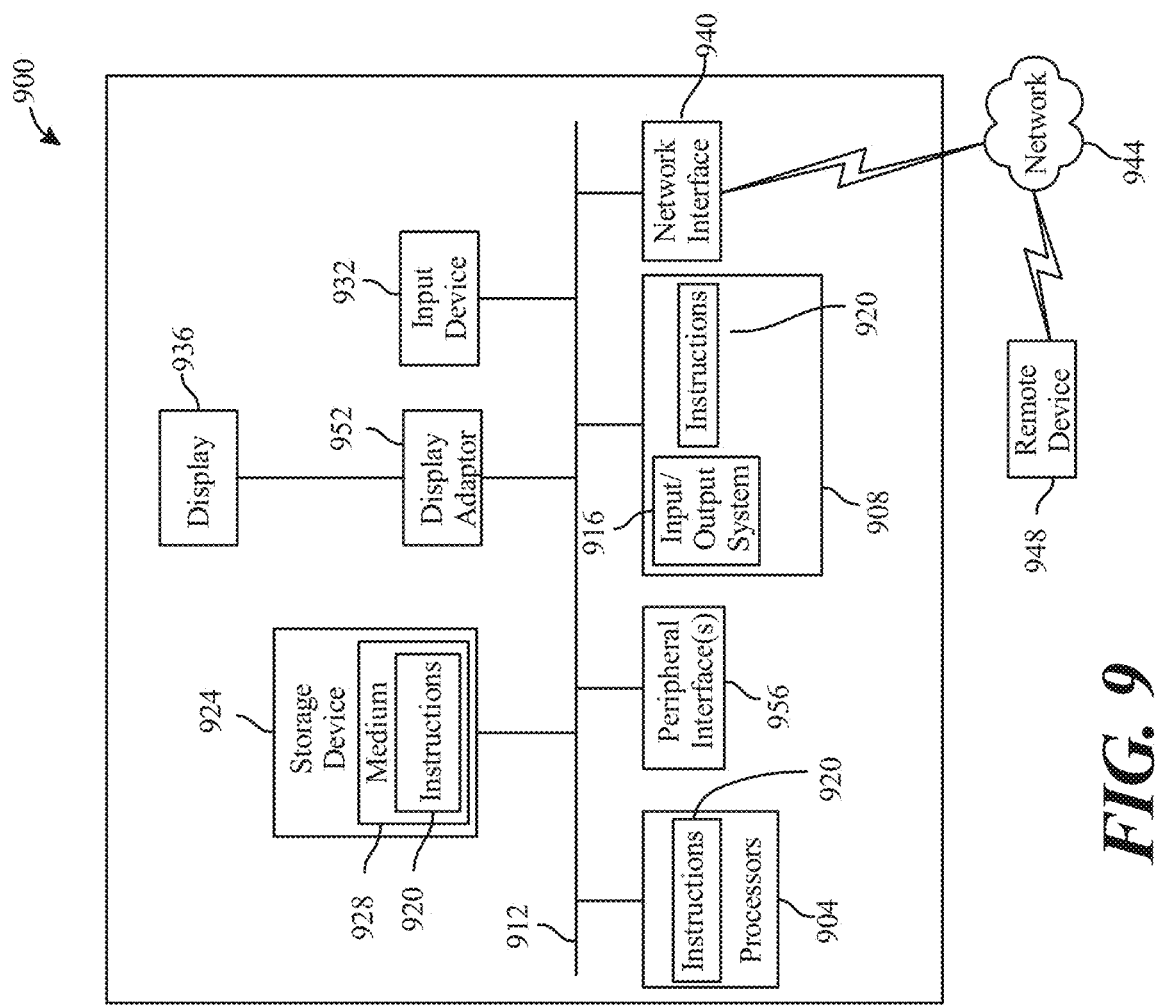
FIG. 9 is a block diagram of a computing apparatus that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatus, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for iterative modification of self-describing data structures, the apparatus comprising:
at least a processor; and
a memory communicatively connected to the at least a processor, wherein the memory contains instructions configuring the at least a processor to:
receive at least an initial self-describing data structure;
aggregate the at least an initial self-describing data structure into a data structure class, wherein aggregating the at least an initial self-describing data structure comprises;
receiving initial data aggregation training data, wherein the initial data aggregation training data comprises initial self-describing data structures correlated to one or more data structure classes;
training a data structure classifier using the initial data aggregation training data, wherein training the data structure classifier comprises:
iteratively updating the initial data aggregation training data as a function of the input and output results of the data structure classifier; and
retraining the data structure classifier with an updated initial data aggregation training data;
generate at least a self-describing data structure as a function of the aggregation of the at least an initial self-referencing data structure;
generate a validated self-describing data structure as a function of the at least a self-describing data structure using a validation module, wherein generating the validated self-describing data structure comprises comparing the at least a self-describing data structure to a set of data consistency rules;
acquire metadata;
modify the validated self-describing data structure, wherein modifying the validated self-describing data structure further comprises:
dividing the validated self-describing data structure into a plurality of data structure modules; and
associating the metadata with a data structure module of the plurality of data structure modules; and
configure a downstream device to generate graphical user interface elements as a function of the validated data structure and the associated metadata.

2. The apparatus of claim 1, wherein acquiring the metadata comprises parsing at least a folder structure of the at least a self-describing data structure for the metadata.

3. The apparatus of claim 1, wherein acquiring the metadata comprises:
interrogating a system clock for temporal data; and
generating the metadata as a function of the temporal data.

4. The apparatus of claim 1, wherein the memory contains instructions further configuring the at least a processor to transmit the at least a self-describing data structure and the associated metadata to the downstream device.

5. The apparatus of claim 4, wherein transmitting the at least a self-describing data structure and the associated metadata to the downstream device comprises:
dividing the modified at least a self-describing data structure and the associated metadata into a plurality of data packets;
assigning header data to each of the plurality of data packets, wherein the header data comprises at least a: destination address of the downstream device; and a packet number; and
transmitting the plurality of data packets to the downstream device using packet-based communication.

6. The apparatus of claim 1, wherein acquiring the metadata comprises:
receiving initial metadata; and
aggregating the initial metadata into a metadata class.

7. The apparatus of claim 6, wherein the aggregating the initial metadata comprises:
receiving metadata aggregation training data, wherein the metadata aggregation training data comprises examples of metadata correlated to one or more metadata classes;
training, using a machine-learning module, a metadata classifier using the metadata aggregation training data; and
generating the metadata class for the metadata using the metadata classifier.

8. The apparatus of claim 1, wherein at least a data structure module of the plurality of data structure modules comprises a tree data structure.

9. A method for iterative modification of self-describing data structure, the method comprising:
receiving, using at least a processor, at least an initial self-referencing data structure;
aggregating, using the at least a processor, the at least an initial self-referencing data structure into a data structure class, wherein aggregating the at least an initial self-referencing data structure comprises;
receiving initial data aggregation training data, wherein the initial data aggregation training data comprises initial self-referencing data structures correlated to one or more data structure classes;
training a data structure classifier using the initial data aggregation training data, wherein training the data structure classifier comprises:
iteratively updating the initial data aggregation training data as a function of the input and output results of the data structure classifier; and
retraining the data structure classifier with an updated initial data aggregation training data;
generating, by the at least a processor, at least a self-describing data structure as a function of the aggregation of the at least an initial self-referencing data structure;
generating, by the at least a processor, a validated self-describing data structure as a function of the at least a self-describing data structure using a validation module, wherein generating the validated self-describing data structure comprises comparing the at least a self-describing data structure to a set of data consistency rules;
acquiring, by the processor, metadata;
modifying, by the processor, the at least a validated self-describing data structure, wherein modifying the at least a validated self-describing data structure further comprises:
dividing the validated self-describing data structure into a plurality of data structure modules; and
associating the metadata with a data structure module of the plurality of data structure modules; and
configuring, by the at least processor, a downstream device to generate graphical user interface elements as a function of the validated data structure and the associated metadata.

10. The method of claim 9, wherein acquiring the metadata comprises parsing at least a folder structure of the at least a self-describing data structure for the metadata.

11. The method of claim 9, wherein acquiring the metadata comprises:
interrogating a system clock for temporal data; and
generating the metadata as a function of the temporal data.

12. The method of claim 9, further comprising transmitting, by the at least a processor, the at least a self-describing data structure and the associated metadata to the downstream device.

13. The method of claim 12, wherein transmitting the at least a self-describing data structure and the associated metadata to the downstream device comprises:
dividing the modified at least a self-describing data structure and the associated metadata into a plurality of data packets;
assigning header data to each of the plurality of data packets, wherein the header data comprises at least a: destination address of the downstream device; and a packet number; and
transmitting the plurality of data packets to the downstream device using packet-based communication.

14. The method of claim 9, wherein acquiring the metadata comprises:
receiving initial metadata; and
aggregating the initial metadata into a metadata class.

15. The method of claim 14, wherein the aggregating the initial metadata comprises:
receiving metadata aggregation training data, wherein the metadata aggregation training data comprises examples of metadata correlated to one or more metadata classes;
training, using a machine-learning module, a metadata classifier using the metadata aggregation training data; and
generating the metadata class for the metadata using the metadata classifier.

16. The method of claim 9, wherein at least a data structure module of the plurality of data structure modules comprises a tree data structure.

* * * * *